July 24, 1962  J. W. A. SCHOLTE  3,046,457
ELECTROLYTIC CAPACITOR
Filed March 4, 1958
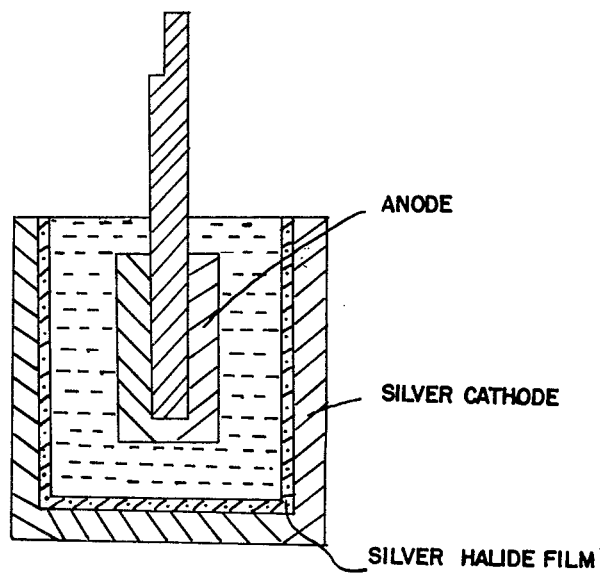
JOHANNES WILHELMUS ANDREAS SCHOLTE.
INVENTOR.
BY
AGENT

United States Patent Office

3,046,457
Patented July 24, 1962

3,046,457
ELECTROLYTIC CAPACITOR
Joannes Wilhelmus Andreas Scholte, Nijmegen, Netherlands, assignor to North American Philips Company, Inc., New York, N.Y., a corporation of Delaware
Filed Mar. 4, 1958, Ser. No. 719,074
Claims priority, application Netherlands Mar. 15, 1957
1 Claim. (Cl. 317—230)

This invention relates to electrolytic capacitors comprising an anode on which by electrolytic oxidation a dielectric oxide film is formed, an electrolyte and a cathode.

In operation, there is produced between the cathode and the electrolyte a contact impedance which adversely affects the quality of the capacitor if the contact resistance is high and the contact capacitance is low. This results not only in a high series-resistance but also in a reduction of the capacitance of the capacitor and a high degree of frequency-dependence.

This phenomenon occurs especially in electrolytic capacitors of small dimensions provided with tantalum or niobium anodes. In these structures, in which the anode surface is usually enlarged by special steps during manufacture in order to ensure a high capacitance, the cathode, which may be designed as a container for the electrolyte, has a comparatively small surface with the resulting occurrence of an inconvenient cathode impedance.

Various efforts have been made to obviate this disadvantage. It is already known that an improvement can be obtained by enlarging the cathode surface by etching. However, etching of the materials used as the cathodes in electrolytic capacitors having tantalum or niobium anodes, for example silver and nickel, generally does not provide a sufficient surface enlargement. Attempts have also been made to counteract an inconvenient cathode impedance by coating the cathode surface with metals or non-metallic substances, such as carbon and silicon. This method, however, does not give satisfactory results. Finally, it has been proposed to coat the cathode with lacquer layers containing finely divided conductive substances, for example metals, oxides or sulphides. However, such lacquer layers have a comparatively high resistance and produce a high series-resistance of the capacitor.

According to the present invention, in an electrolytic capacitor having a tantalum or niobium anode provided with a dielectric oxide layer the occurrence of an inconvenient cathode impedance is counteracted by converting the surface metal of the cathode into a compound of this metal and the anion contained in the electrolyte, which compound does not dissolve in the electrolyte.

The drawing is a sectional view of an illustrative embodiment of the capacitor.

Thus, if the electrolyte is a solution of a halide, for example LiCl or KI, a silver cathode can be superficially converted into AgCl or AgI, while, if a phosphoric acid electrolyte is used, a cathode made of silver or nickel can be superficially converted into phosphate. Generally, cathode coatings having a thickness of a few tens of microns suffice to achieve the improvement aimed at. The use of thicker layers results in an unnecessary increase in the contact resistance at the cathode and consequently in the series-resistance of the capacitor.

The cathode can be provided with the required layer by chemical or by electrolytical treatment. A silver cathode, for example, may be coated with AgI by reacting it with an iodine solution. The cathode can readily be phosphated electrolytically by immersing the metal as the anode in a solution of phosphoric acid.

The cathode coating in accordance with the invention provided the advantage that the layers have satisfactory adherence, even a slight thickness providing a considerable improvement of the properties of the capacitor, as will be demonstrated hereinafter with reference to two examples.

*Example I*

An electrolytic capacitor is built up from a silver cathode, a tantalum anode and an electrolyte. The cathode consists of a silver tube having a diameter of 3.5 mms. and a length of 6.5 mms., while the anode is a porous sintered tablet of powdered tantalum having a diameter of 1.5 mms. and a length of 5 mms., which is oxidized electrolytically to a voltage of 8.5 volts. The electrolyte is a substantially saturated solution of KI.

This electrolytic capacitor has a series-resistance of 13 ohms and a series capacitance of 18$\mu$f. at 50 c./s. which fall to 2.3$\Omega$ and 10$\mu$f. respectively at 5000 c./s.

When a silver cathode tube is treated with a solution of 2 gms. of iodine in 5 ccs. of ¾ saturated KI-solution at 50° C. for half an hour, the cathode surface is converted into AgI. If this cathode tube is used in a capacitor which otherwise is built as described hereinbefore, at 5 c./s. this capacitor has a series-resistance of 6.5$\Omega$ and a series capacitance of 18$\mu$f., which at 5000 c./s. drop to 1.6$\Omega$ and 14$\mu$f. respectively.

By the treatment of the cathode in accordance with the invention, a capacitor is produced having a lower degree of frequency dependence and a lower series-resistance.

*Example II*

Two nickel plates, which each have a surface area of 7 sq. cms., are electrolytically phosphated in a 5% phosphoric acid solution with a current density of 200 ma./sq. cm. for 2 hours.

Subsequently, the impedance between these plates and also that between two non-phosphated plates are measured in a 50% phosphoric acid electrolyte with the use of an alternating voltage of about 100 mv. Owing to the high conductivity of the phosphoric acid electrolyte, the relative arrangement and the relative distance of the plates are of little importance for the result of the measurement. Thus, no appreciable difference is measured whether the plates are parallel arranged or alined with one another.

In this manner, a measurement is made of two times the value of the impedance produced at the nickel plates in the phosphoric acid electrolyte. At the frequencies of 50 c./s. and 1000 c./s. the phosphated plates show a capacitance of 210$\mu$f. and 150$\mu$f. and a resistance of 4.5$\Omega$ and 1$\Omega$ respectively, whereas in the untreated plates the capacitance is 70$\mu$f. and 40$\mu$f. and the resistance is 21$\Omega$ and 1$\Omega$ respectively. From this it will be seen that the phosphating process increases the capacitance, decreases the resistance and reduces the frequency-dependences. Consequently, when phosphated nickel is used for the cathode in an electrolytic capacitor, the inconvenient influence of the cathode impedance is materially reduced.

What is claimed is:

An electrolytic capacitor comprising an anode selected from the group consisting of tantalum and niobium, a dielectric oxide film being present on said anode, an electrolyte consisting of an aqueous solution of phosphoric acid and a nickel cathode, the surface of said cathode being formed of nickel phosphate.

References Cited in the file of this patent

UNITED STATES PATENTS

| | | |
|---|---|---|
| 1,773,665 | Edelman | Aug. 19, 1930 |
| 1,986,779 | Lilienfeld | Jan. 1, 1935 |
| 2,834,926 | Booe | May 13, 1958 |
| 2,871,423 | Aikman | Jan. 27, 1959 |
| 2,871,424 | Aikman | Jan. 27, 1959 |
| 2,910,633 | Hovey | Oct. 27, 1959 |

FOREIGN PATENTS

| | | |
|---|---|---|
| 150,958 | Great Britain | Dec. 8, 1921 |